United States Patent [19]

Blakeley et al.

[11] Patent Number: 5,563,878

[45] Date of Patent: Oct. 8, 1996

[54] TRANSACTION MESSAGE ROUTING IN DIGITAL COMMUNICATION NETWORKS

[75] Inventors: Douglas B. Blakeley; John R. Hind, both of Raleigh; Barron C. Housel, III, Chapel Hill, all of N.C.; William A. Kingston, Chandlersford, England

[73] Assignee: International Business Machines Corporation, Armonk, N.Y.

[21] Appl. No.: 369,051

[22] Filed: Jan. 5, 1995

[51] Int. Cl.$^6$ .................................................. H04L 12/56
[52] U.S. Cl. ..................... 370/60; 370/96.1; 340/825.07; 340/825.52
[58] Field of Search ........................... 370/17, 58.1, 58.2, 370/60, 92, 93, 94.1; 340/825.03, 825.06, 825.07, 825.52; 364/940, 940.74, 940.64

[56] References Cited

U.S. PATENT DOCUMENTS

| | | | |
|---|---|---|---|
| 4,423,414 | 12/1983 | Bryant et al. | 340/825.07 |
| 4,677,588 | 6/1987 | Benjamin et al. | 364/900 |
| 4,718,005 | 1/1988 | Feigenbaum et al. | 364/200 |
| 4,873,517 | 10/1989 | Baratz et al. | 340/825.03 |
| 4,931,941 | 6/1990 | Krishman | 364/437 |
| 5,025,491 | 6/1991 | Tsuchiya et al. | 340/825.52 |
| 5,086,428 | 2/1992 | Perlman et al. | 370/94.1 |
| 5,095,480 | 3/1992 | Fenner | 370/94 |
| 5,133,053 | 7/1992 | Johnson et al. | 395/200 |
| 5,142,622 | 8/1992 | Owens | 395/200 |
| 5,166,931 | 11/1992 | Riddle | 370/94.1 |
| 5,206,856 | 4/1993 | Chung | 370/60 |
| 5,262,906 | 11/1993 | Mazzola | 370/54 |
| 5,309,433 | 5/1994 | Cidon et al. | 370/60 |
| 5,353,283 | 10/1994 | Tsuchiya | 370/60 |
| 5,383,179 | 1/1995 | Saini et al. | 370/54 |
| 5,394,393 | 2/1995 | Brisson et al. | 370/60 |
| 5,398,012 | 3/1995 | Derby et al. | 340/825.03 |
| 5,440,547 | 8/1995 | Easki et al. | 370/60 |
| 5,487,064 | 1/1996 | Galand et al. | 370/94.1 |

OTHER PUBLICATIONS

C. A. Sunshine, "Addressing problems in Multi-Network Systems," *1982 IEEE*, pp. 12–18, Sep. 1982.
D. C. Oppen and Y. K. Dalal, "The Clearinghouse: A Decentralized Agent for Locating Named Objects in a Distributed Environment," *ACM Transactions on Office Information Systems*, vol. 1, No. 3, pp. 230–253, Jul. 1983.
L. Kleinrock and F. Kamoun, "Hierarchical Routing for Large Networks—Performance Evaluation and Optimization," *Computer Networks*, vol. 1, pp. 155–174, 1977.
J. F. Shoch, "Inter-Network Naming, Addressing and Routing," *IEEE*, pp. 72–79, 1978.
A. D. Birrell, R. Levin, R. M. Needham and M. D. Schroeder, "Grapevine: An Exercise in Distributed Computing," *Comunications of the ACM*, vol. 25, No. 4, pp. 260–274, Apr. 1982.
F. C. M. Lau and E. G. Manning, "Cluster–Based Naming for Reliable Distributed Systems," 1984 *IEE*, pp. 146–154, Jun. 1984.

(List continued on next page.)

*Primary Examiner*—Benedict V. Safourek
*Assistant Examiner*—Ricky Q. Ngo
*Attorney, Agent, or Firm*—Jerry W. Herndon; Robert O. Nimtz

[57] ABSTRACT

Packet messages transmitted on a packet communications network include origin and destination addresses in the form of stacked address elements which can be pushed or popped off of the stack. A plurality of interconnected packet communications network include routing nodes which utilize the top address element on the destination stack to route the message. Such routing nodes also include stack element editing facilities for popping elements from the stacks, constructing new elements to be pushed onto the stacks, and amending the contents of elements on the stack. This arrangement allows messages to be launched on the networks where the originating station does not have full knowledge of the destination station, and the routing nodes add the necessary destination information as it becomes necessary for routing.

2 Claims, 6 Drawing Sheets

OTHER PUBLICATIONS

Z-S. Su and J. E. Mathis, "Internetwork Accommodation of Network Dynamics: Naming and Addressing," *The New World of the Information Society*, Elscrier Science Publishers R. V. (North Holland), 1985.

K. A. Lantz, J. I. Edighoffer and B. I. Hitson, "Towards a Universal Directory Service, " *4th PODC Conference Proceedings*, ACM, pp. 43–53, Sep. 1985.

D. R. Cheriton and T. P. Mann, "A Decentralized Naming Facility," *Department of Computer Science, Stanford University*, Report No. STAN-CS-86-1098, Feb. 1, 1986.

B. U. Lampson, "Designing a Global Name Service," *1986 ACM*, Order No. 1986 ACM 0-89791-198-9/86/0800-0001, Sep. 1986.

P. Mockapetris, "Domain Names—Implementation and Specification," *ISI Network Working Group, RFC 1035*, pp. 1–54, Nov. 1987.

TRANSACTION MESSAGE ROUTING IN DIGITAL COMMUNICATION NETWORKS

TECHNICAL FIELD

This invention relates to the routing of digital messages through a packet communication network and, more particularly, to the use of flexible routing control formats and to editing capabilities distributed throughout the network for altering or enhancing routing information associated with digital messages at one or more intermediate points in a multi-node route through the communication network.

BACKGROUND OF THE INVENTION

Message routing is a function that enables a network user program (or agent) to send a message to another user program. Packet communication systems do not reserve transmission facilities for the duration of a session, but only reserve individual links in the transmission path, and only for the duration of a packet. It is therefore necessary to provide a mechanism for routing digital packets through the packet network. All packet communications networks utilize a header, preceding the data packet, which contains sufficient information to control the routing of that packet from the origin of the packet to the destination of the packet.

Many routing mechanisms have been evolved in the prior art packet networking technologies. For example, Automatic Network Routing (ANR), requires the pre-calculation of the entire route from origin to destination, and identifying each link in this route in the packet header. At each intermediate node along the route, the identification of the previous link is stripped away from the header to expose the identification of the next link in the route. Message broadcasting, or multi-casting, on the other hand, utilizes a single identification of a multi-cast tree in the header and, at each intermediate node, utilizes the tree identifier to select the outgoing link or links which are included in the multi-cast tree. Yet other routing algorithms utilize the destination address in the header to select, using a routing table, the next link in the route. Note that all of these prior art routing schemes require the pre-definition of the route, either for the ANR link identifiers, the multi-cast tree definition or the routing table contents.

In many applications, the determination of the links in a route from origin to destination is preferably deferred until after the packet is launched on the network. Alternate routing in the face of link failures or to avoid congested nodes, for example, are two situations where deferred routing might be desirable. In addition to alternate routing, it may be desirable to perform other intermediate processing of a packet during the transit from origin to destination. It may, for example, be desirable to transform the data to a new format for transmission on particular links, and it may also be desirable to log and authenticate entry into foreign networks at the gateways to such foreign networks for separate billing and for network support from different network owners. Finally, address directories may be used along the route to resolve destination names or addresses in view of the content of the data, e.g., routing "800" telephone numbers or routing credit card transactions based on credit card numbers. Routing flexibility's such as those described above are important for many real time applications. Unfortunately, all of the prior art schemes for providing routing flexibility in a packet network are application-dependent, thus requiring separate routing mechanisms for different transaction codes or different user identifications. Since there is no upper bound on the number of such routable data objects, the complexity of the routing mechanisms can likewise grow without bounds.

SUMMARY OF THE INVENTION

In accordance with the illustrative embodiment of the present invention, universal routing flexibility for all possible types of packets is provided for all such data packets by the introduction of a "Naming and Addressing Parameter String (NAPS)" into the header of each packet, the introduction of "Routing Services (RS)" modules into all nodes, and the introduction of "Routing Application Programs (RAPS)" into selected nodes in the network. More particularly, in the illustrative embodiment, the routing header includes a NAPS structure which includes one or more message routing addresses, each of which may include, in turn, an identification of an intermediate or destination node, an identification of an application or routing agent program, and a user-specified parameter that is passed to the agent program to properly process the destination information, e.g., a directory identifier. The RS receives the message at a node and performs the generic NAPS processing that is common to all nodes. RS receives a message, analyzes the NAPS top element fields, and sends the message to another node if the destination node is a remote node, or sends the message to a local application agent program or to a local RAP if the destination node is the message-receiving node. The RS includes look-up tables to assist in the NAPS processing. More particularly, a Destination Node Table (DNT) is used to select the next node in the route to the specified destination node. A Local Agent Table (LAT), on the other hand, identifies all of the local agents connected to the local node. A RAP, on the other hand, is a special type of agent that executes special logic that updates the NAPS and the passes the message to the RS to route the message toward its next processing point, which could be an application agent program or another RAP. Nodes of the network which contain RS and RAPs are called "Message Routing (MR)" nodes and are used to provide all of the routing flexibility of the present invention.

Note that packet networks equipped with NAPS, RS and RAPs as described above provide routing flexibility for all types of data packets without the necessity of designing and implementing separate flexibility for each of many classes of data packets. This flexibility can therefore be invoked by all users of the network to implement the particular routing processing required for the packets utilized by that user. This application-independent aspect of the flexible routing mechanisms of the present invention is of particular importance in reducing the cost and complexity of the network architecture. The single NAPS/RS/RAPS mechanism of the present invention can be applied to an arbitrarily large number of different data packet classes by allowing the user to specify significant variables in the route editing facility.

In accordance with one feature of the present invention, the editing function is under the control of an edit table which contains specific directions for editing a particular NAPS. In accordance with this feature of the present invention, the route editing mechanism is under the control of one or more such tables specifying the editing steps necessary to transform the current NAPS into the desired NAPS.

It can be seen that the provision of a standard form header and header processing capability in at least some of the intermediate nodes of the network permits deterred routing to accommodate not only link failures or congestion, but also to permit data-dependent routing, routing-dependent data processing and administrative processing at inter-network boundaries.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
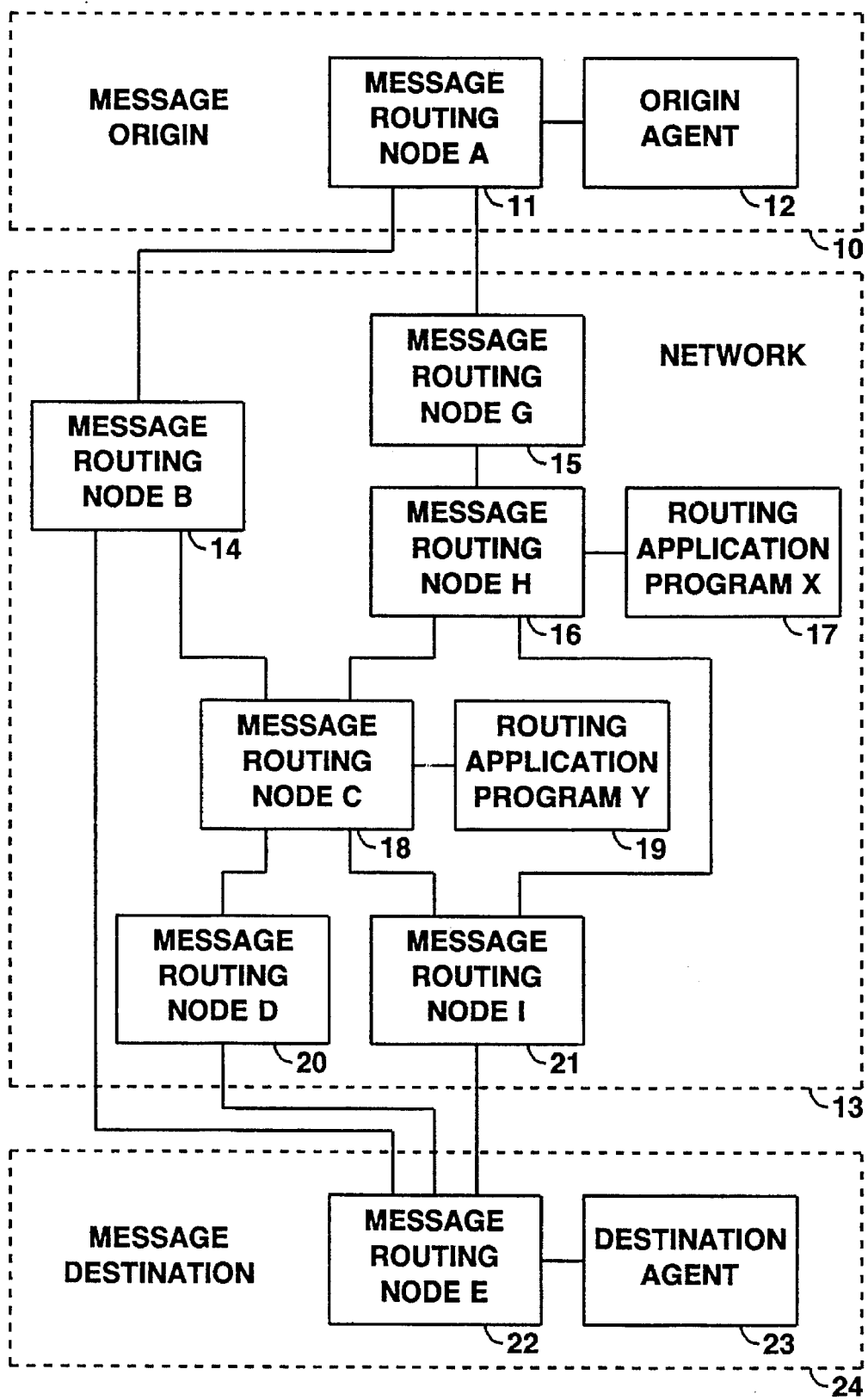
FIG. 1 shows a general block diagram of a packet communications network including the universally flexible routing mechanisms (Routing Application Programs (RAPs) of the present invention.

Referring more particularly to FIG. 1, there is shown a general block diagram of a packet communications system including a message originating location 10, a transmission network 13 and a message destination location 24. Message originating location 10 comprises an originating message routing agent 12 and a message routing node 11. Originating agent 12 is a computer program which requests the use of the transmission network 13 to transmit a message to a destination agent 23 (another computer program at a remote location). Similarly, destination location 24 includes a message routing node E (22) and a message routing destination agent 23. From the perspective of the message routing function, a message routing agent is any program that uses the message routing function. Normally, message routing agents such as 12 and 23 comprise resource managers that provide many other services besides message routing, such as message queuing.

The packet communications system of FIG. 1 includes a plurality of message routing nodes A–I interconnected by transmission links. Thus, node A (11) is connected to nodes B (14) and G (15), node B is connected to nodes C (18) and E (22), node G is connected to node H (16), node H is connected to nodes C (18) and I (21), and node I is connected to node E (22). The interconnections of the message routing nodes A through I is only illustrative and many more nodes could be included in the packet network, interconnected by many other transmission links. In accordance with well known packet network technology, the message routing nodes A through I utilize information in the headers of the packets launched on the network to route the packet to the appropriate destination node. Message routing networks such as network 13 are connectionless networks in which many messages from many different origins may be flowing simultaneously on a given connection between a pair of nodes. The function of the node is to forward each of the messages, received from a connected node, toward its ultimate destination.

One or more of the message mounting nodes A through I of FIG. 1 has associated therewith a routing agent program (RAP). Routing agent program 17, for example, is associated with node H (16) while routing agent program 19 is associated with node C (18). In accordance with the present invention, RAPs 17 and 19 are used to process the headers of packets launched on the network 13 to assist in determining the actual ultimate destination of the attached packet, using information found in the header of the packet. The purpose of the routing agent programs is to permit the selection of the message destination to be deferred until the message is actually traversing the path to the destination node. Such routing flexibility is important for many real time applications such as:

Routing a message to an intermediate point for further address resolution, for example by invoking a directory to resolve a name into an address or to determine the destination based on the data content (e.g., an "800" number or a credit card number).

Selecting an alternate destination in case of a failure of the primary destination node or system.

Selecting a destination based on load balancing considerations.

Performing transforms on the message data, possibly for transmission on a particular medium.

Logging and authentication of the message at gateways between different networks, possibly owned by different enterprises.

In order to implement the universal, flexible deferred routing mechanism of the present invention, a Naming and Addressing Parameter String (NAPS), consisting of one or more address elements, is included in the header of each message launched on the network. More particularly, the NAPS structure is used to specify both the source address and the destination address in the message header. The desired flexibility is implemented by the interaction of these NAPS with the RAPs. More particularly, the RAPs can be used to:

Edit the destination NAPS enroute to alter the ultimate destination or even the next node in the route.

Enhance the NAPS information by user-provided extensions such as user directory identifications or user security verification identifications to determine if a message should be permitted to pass a given network gateway. A particular RAP address may, for example, be included in the routing simply to ensure the appropriate NAPS processing.

Store lists of destinations to determine the path and the intermediate processing to be performed on the message (the NAPS or the data itself) enroute to the final destination.

Control the node switching operation to determine when, where and how a particular message is to be switched from one point to another.

These functions will be described hereinafter.

The NAPS can be formally defined as follows

<naps>::=(<naps-element>[,<naps>])

<naps-element>::=[node-id>][, <agent-name>][,<agent-parameters>]

The notation of the above definition of the NAPS is used for expository purposes only and does not represent the architectural form of the NAPS. The parentheses delimit the NAPS components, a comma separates NAPS elements and brackets show that a element is optional. The actual encoding of the NAPS is entirely optional and can, for example, be encoded using the ISO Abstract Syntax Notation One (ASN.1). In the above definition, (naps–element) defines a "message routing address" that consists of the following three-tuple:

<node–id> specifies the destination node of the message.

<agent–name> identifies the agent that is to receive the message at the destination node.

<agent–parm> parameters passed to the receiving, agent such as a directory name.

The NAPS is defined recursively, permitting the specification of a sequence of successive, intermediate locations for message processing, yielding a very powerful naming and addressing facility.

Figure 2:
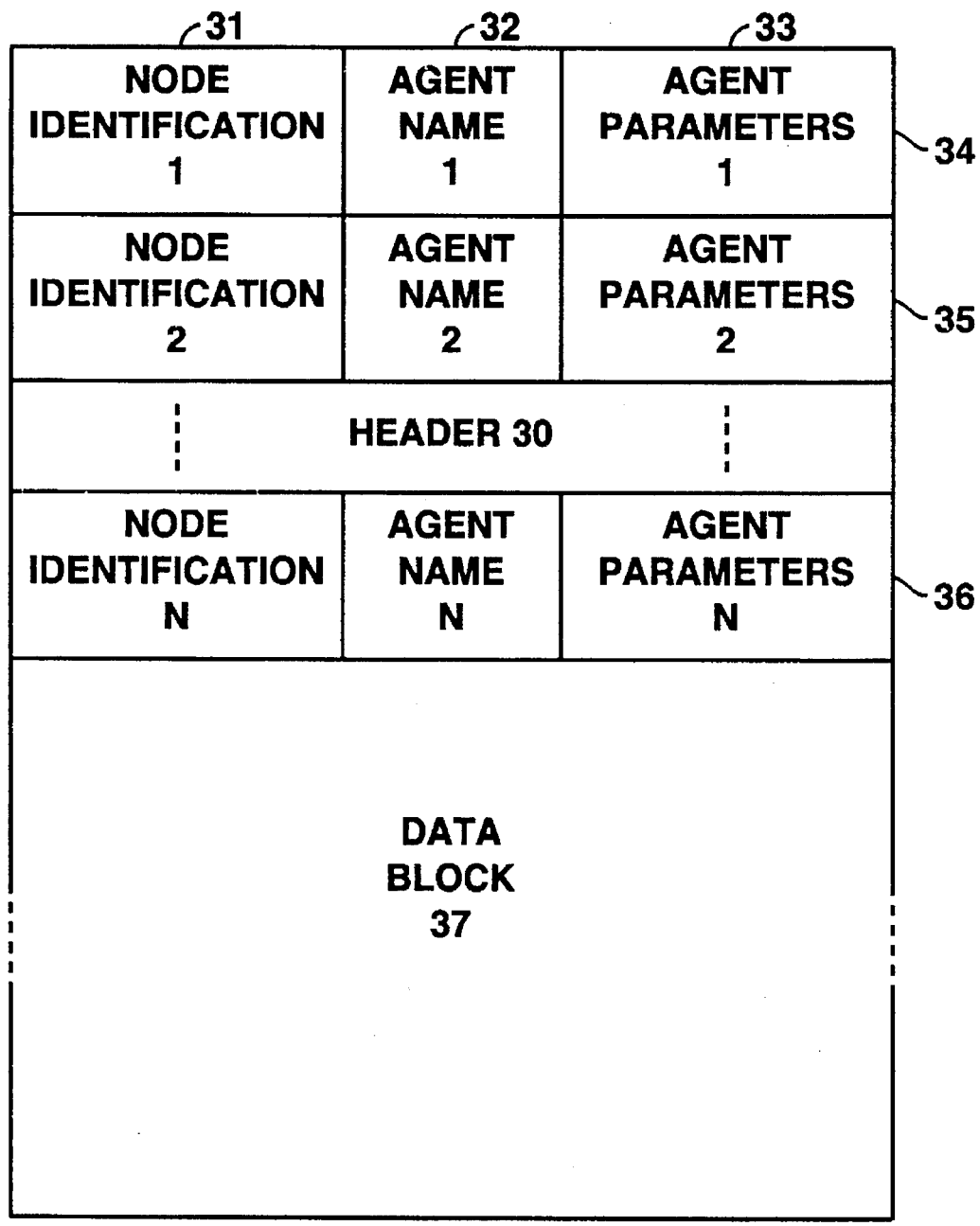
FIG. 2 shows a graphical representation of one Naming and Addressing Parameter String (NAPS) in accordance with the present invention which might be processed in the RAPs of FIG. 1.

In FIG. 2 there is shown a graphical representation of a packet message comprising a packet header 30, and a data block 37 associated with header 30. Header 30, in turn, comprises a plurality of message routing addresses 34, 35, . . . , 36, each comprising a node identification field 31, an agent name field 32 and an agent parameter field 33. Most networking protocols allow one destination and one origin address per message. The message routing method and apparatus of the present invention, however, permit both the destination and the origin addresses to consist of an arbitrarily deep stack of address elements. Although each NAPS element may consist of three components (NodeName, AgentName and AgentParm), any of these components can be null, having the implications to be discussed later.

Before proceeding to a more detailed description of the invention, is first useful to discuss the naming conventions which might be used in specifying the node and agent names in the NAPS. Such nodes and agents may, for example, have global names which are unique throughout the network in which they are used. To this end, such names can follow existing network naming conventions which are intended to be global. Many existing network architectures, such as IBM's SNA, ARPA's TCP/IP and ISO's X.400 E-mail, have an already-existing naming authority hierarchy which allow network administrators to create globally unique names by registering company or business unit names and creating new names by appending subunit names to the registered name. For example, suppose a company is name "ABC, Inc." and the network administrator for the "DE" division of ABC, Inc. has registered the structured Network Identifier USABCxx with IBM as the registration authority for SNA network identifiers and the ABC, Inc. corporate headquarters has allotted the network identifier USABCDE for use by the DE division. Under the SNA naming rules, the DE division has the authority to create network qualified names of the form USABCDE.xxxxxxxx, where "xxxxxxxx" is a name that obeys the rules for LU names. Not only can the user create globally unique names for the SNA LUs, PUs and Control Points, but can also generate global names for their Message Routing resources using the form "(SNA, USABCDE.xxxxxxxx)"

On the other hand, registration with Internet would allow the generation of global names of the form "(IP, xxxxxxxx.DE.ABC.com)"

assuming that the company name as a commercial enterprise with ANSI, and that the corporate network administrator has assigned the qualifier DE to the division. Of course, a user can register an arbitrary string as its global name. For this purpose, the Message Routing resources of the present invention supports names conforming to the Net BIOS and MQ-Series architectures, as well as "undefined" strings. Since these latter name styles are not supported by any international naming authority hierarchy, global uniqueness cannot be assured.

Logical links between any two MR nodes is called a "pipe." Pipes can be implemented using logical connections provided by existing communications subsystems such as the SNA sessions, OSI associations or TCP/IP connections. Each message of the format of FIG. 2 may include a bit string representing the message class of the message. The message class specifies the routing properties required for the message (e.g., SECURE or EXPEDITE) and acts as a filter to ensure that a chosen path satisfies the requirements of the message.

The power of the message routing technology outlined in FIGS. 1 and 2 lies in its ability to route messages even though the originator of the message does not know the identity of or the location of the ultimate recipient of the message. These capabilities are implemented by the NAPS and the following three tables:

TABLE I

Local Agent Table

| AgentName | Agent Process Access and Status |
|---|---|

TABLE 2

Destination Node Routing Table

| DestinationNodeName | MessageClass | Pipe Process Access and Status |
|---|---|---|

TABLE 3

NAPS Edit Table

| Node Name | Agent Name | Action | New Node Name | NewAgent Name | New Agent Parameter |
|---|---|---|---|---|---|

In TABLES 1, 2 and 3, the NodeName field has the form of a global name as discussed above, and should nominally be the name of an existing message routing node on the network. In reality, this name can be anything and will be processed as discussed below in connection with the routing algorithm of FIGS. 3 through 6. Real MR global names, however, should be unique among all of the nodes that will send messages to this node. This is most easily accomplished by selecting a name that is globally unique across all node names around the world, as described above.

The AgentName field also has the form of a global name and is nominally the name of an existing Message Routing agent, but in reality can be null or may represent a class or a set of agent, or anything else. This will likewise be explained in connection with the routing algorithm of FIG. 3. The AgentName must be unique among all of the agents that reside on that node. Moreover, agent names that represent classes or sets of agents should be unambiguous across all nodes where other agents may reference the agent name. For example, the Passport Credit Card Company may choose to deploy an agent name "Passport Authorize" for a set of credit card authorization applications distributed across a set of networks. At the same time, the U.S. Customs server might deploy the same agent name for an application that authorizes the renewal of passports. The network administrators are responsible for ensuring that it is impossible for a message sent to one of the applications to arrive at the other. The use of one of the above-described network architecture global naming standards insures global uniqueness.

The AgentParm field is for the use of agents to pass small amounts of data between themselves. The Routing Agent Programs (RAPs) can examine and even modify the AgentParm fields. Note that only agents and RAPs constructed with each other in mind can utilize the AgentParm field and generic RAPs would not examine or make use of the AgentParm field.

The component of each Message Routing (MR) node that performs message routing is called the Routing Services (RS) component. Routing Services receives messages from three different sources:

Application agents that are originating messages;

Routing agents that are originating messages or rerouting messages that they have intercepted in transit; and Pipes that have received messages from other MR nodes. RS processes each of the above messages in the same way, regardless of the message's source, as shown in the flow chart of FIG. 3.

Figure 3:
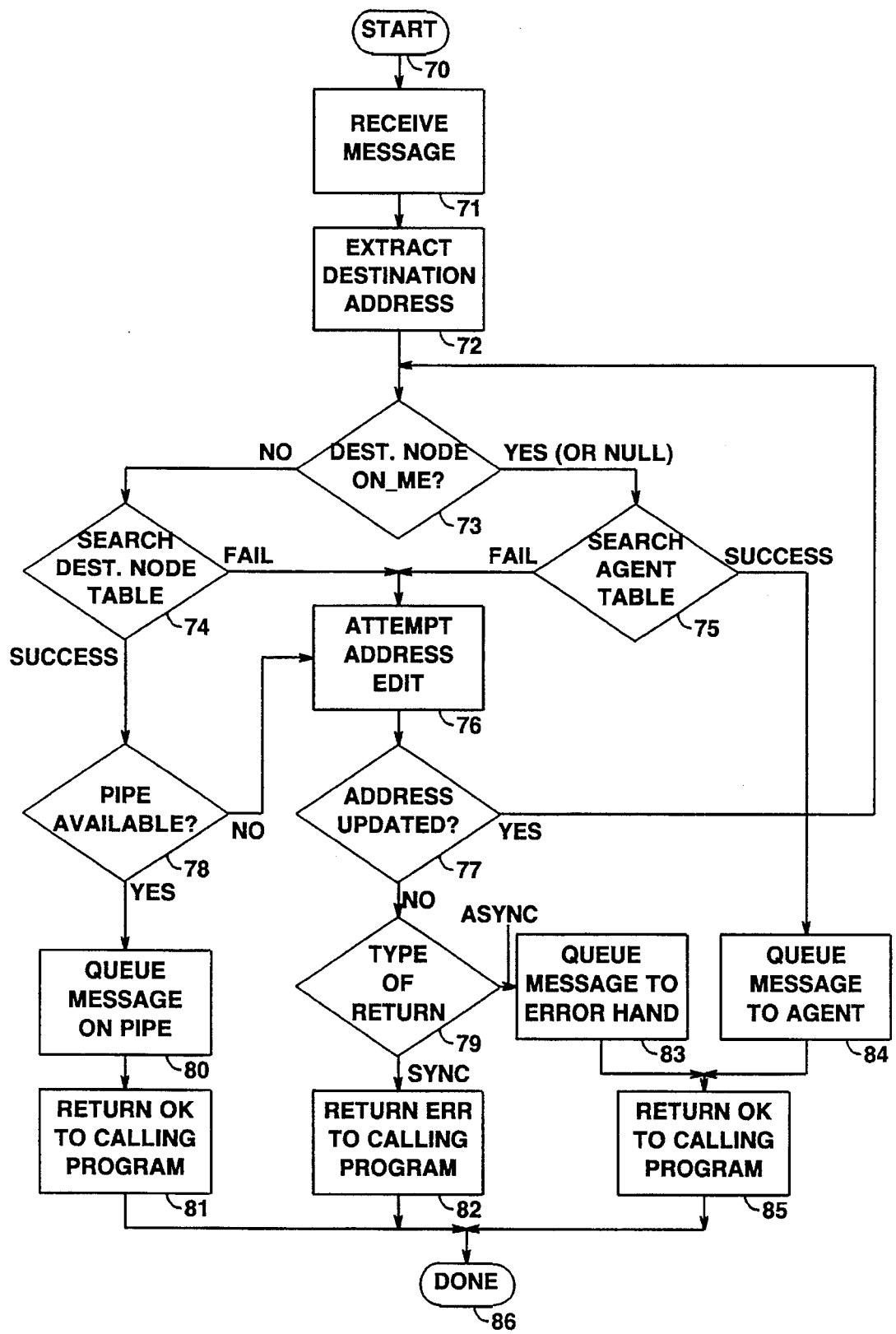
FIG. 3 shows a detailed flow chart of the NAPS processing taking place in the Routing Application Programs of FIG. 1.

Turning then to FIG. 3 of the drawings, the routing algorithm according to the present invention which is implemented in each MR node of FIG. 1 begins in start box 70 and enters box 71 to receive a message from a local or a remote Agent on the network system. The RS of FIG. 3 operates only on the top element of the destination NAPS in the header of the message. The decision box 73 examines the NodeName field (TABLE 2) in this top element of the destination NAPS. This NodeName field can have one of four values:

It can be null.

It can be the name of this MR node.

It can be the name of another MR node, somewhere else in the network.

It can be a pseudo node name, to be used as described below.

If the value of the NodeName field is null (which it would be if the message were received from a local agent or local Routing Agent Program (RAP), but which can never be the case if this message is received from a pipe), the RS assumes that the message is destined from some agent or RAP on this node. As will be described later, this may not be the case. If the NodeName field in the top element of the NAPS stack contains either the name of this node or is null, decision box 73 assumes that the destination agent is this node and goes to decision box 75 to search the Local Agent Table (TABLE 1 above). The Local Agent Table is a list of all agents and Routing Agent Programs (RAPS) that are actively running on this node. If an entry matching the agent name field is found, box 84 is entered where the message is queued to the agent or RAP identified in the Local Agent Table. Box 85 is then entered to return an acknowledgment to the calling program and the process of FIG. 3 terminated in box 86. If the name is not found in the Local Agent Table, as determined by decision box 75, or if the agent name in the NAPS is null, box 76 is entered to attempt to edit the address element at the top of the NAPS. This editing process is described in detail in connection with FIGS. 4 and 5.

If the NodeName field of the top element of the incoming message NAPS contains the name of some other MR node, or contains the name of a pseudo node, as determined by decision box 73, decision box 74 is entered to attempt to determine the identity of the pipe to be used to forward the message on its way to the named identification node. To this end, the Destination Node Table (TABLE 2) is searched, using the combination of the NodeName in the NodeName field and the message class of the message. If a suitable pipe cannot be found, as determined by decision box 78, box 76 is entered to attempt to edit the NAPS, as will be described in connection with FIGS. 4 and 5. If the search for a suitable pipe succeeds, as determined by decision box 78, box 80 is entered to queue the message for transmission on the pipe so identified. Box 81 is then entered to return an acknowledgment to the calling program. Terminal box 86 is then entered to terminate the process of FIG. 3.

Figure 4:
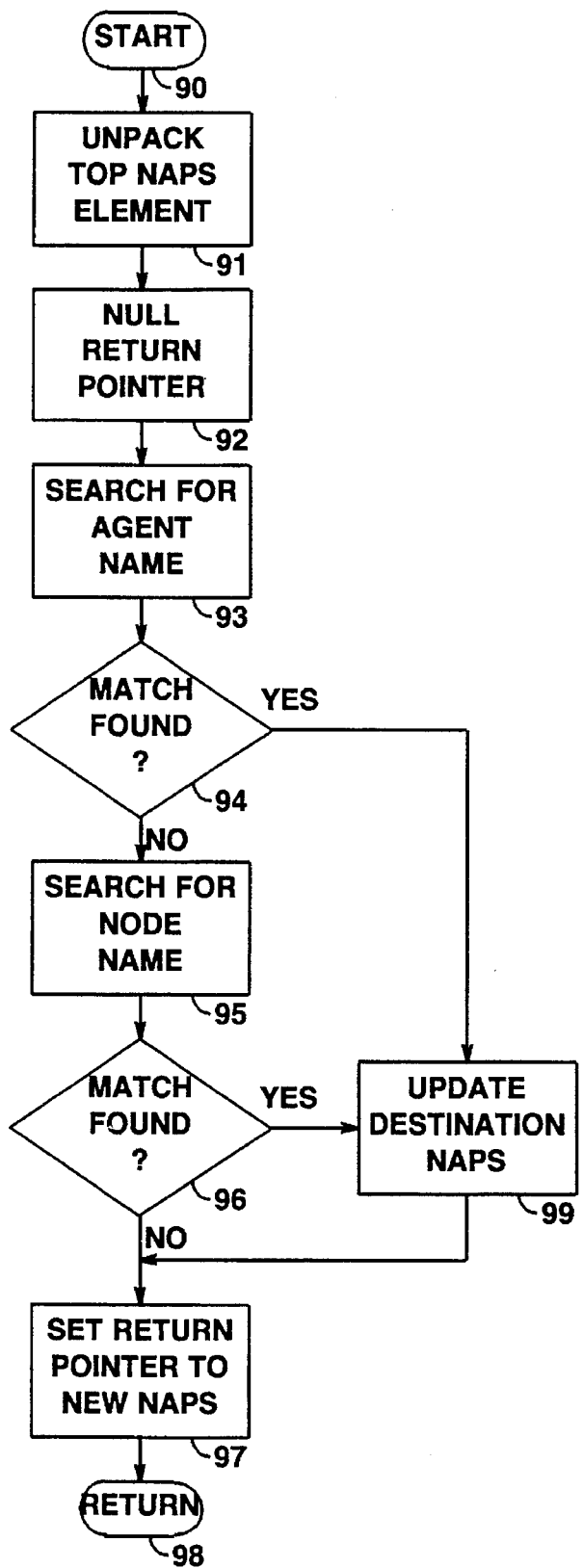
FIG. 4 shows a detailed flow chart of the process taking place in the NAPS editor shown in FIG. 3.
Figure 5:
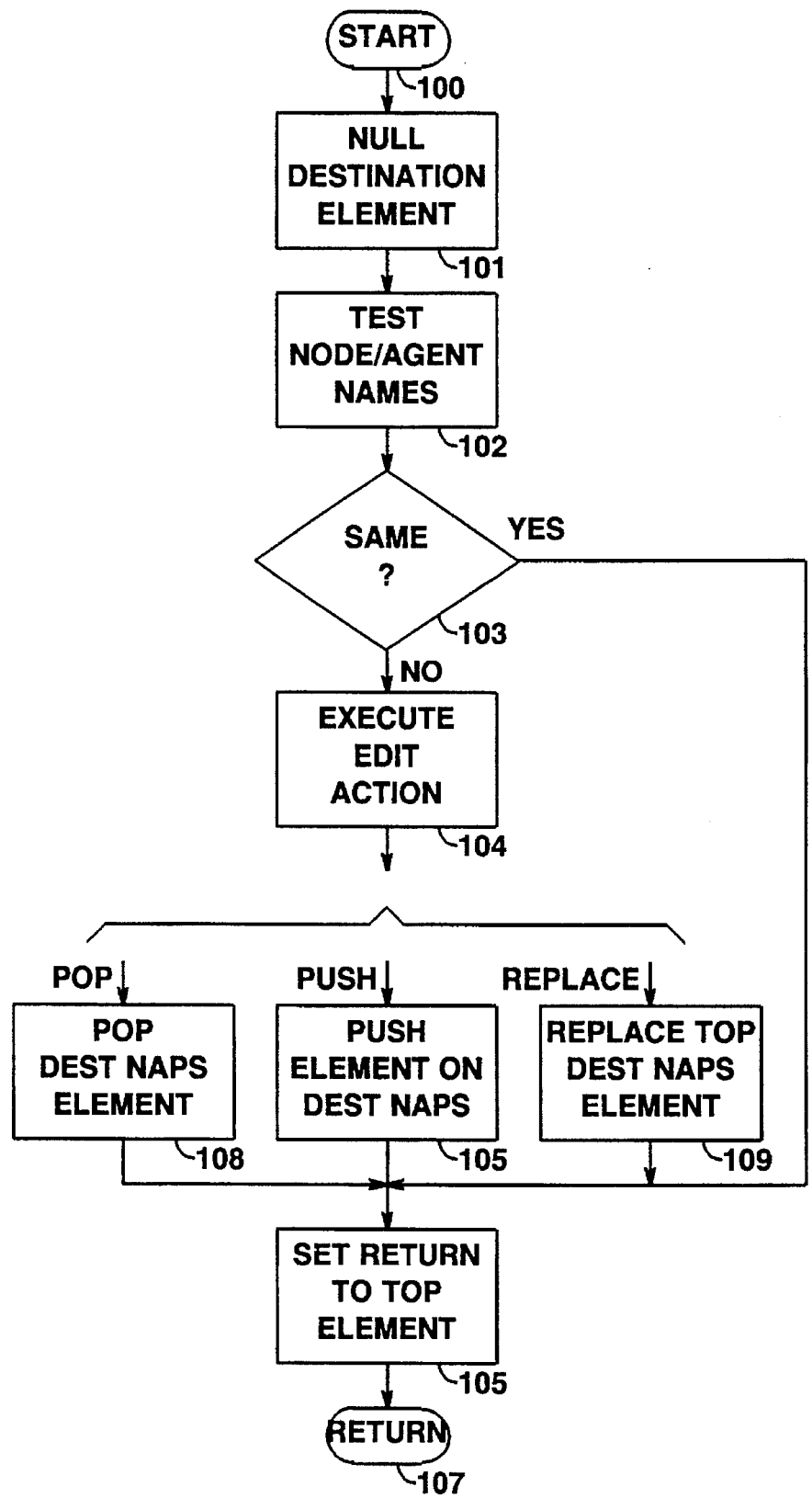
FIG. 5 shows a detailed flow chart of the NAPS updating process shown in general form in FIG. 4.

If address editing box 76 is entered, due to a failure in the searches in either box 74, 75 or 78, the processes of FIGS. 4 and 5 are used to attempt to edit the destination NAPS. Decision box 77 is then entered to determine if the address was actually updated in box 76. If so, box 73 is re-entered to re-analyze the newly edited NAPS. If no editing has taken place in the most recent attempt in box 76, as determined by decision box 77, decision box 79 is entered to determine the type of error return to be used, either synchronous or asynchronous. The program that calls the process of FIG. 3 specifies whether it wants a synchronous or an asynchronous error return. A synchronous return returns control to the caller with an error return code in box 82. An asynchronous return queues the message to a special agent called the "Error Handler" in box 83. The error handler, in turn, sends a negative acknowledgment to the sender at the origin node. Note that box 85 is then entered to return an OK to the RS caller because responsibility for the message has been transferred to the error handler and the caller need not react. In either event, the process of FIG. 3 terminates in terminal box 86.

The editing function of box 76 of FIG. 3 can be simple or very sophisticated. While a simple editor will be described in connection with FIGS. 4 and 5, it is clear that much more complex editors can be used as required by the various users of the network. As a minimum, however, such an editor must at least be able to pop a NAPS element off of the destination address stack when it is no longer needed, must be able to add a new NAPS element onto the destination address stack to provide new routing information and yet preserving the existing routing information for processing at another routing point along the message path, and must be able to replace one or more NAPS element fields to correct or amend the required information. Such an editor is shown in FIGS. 4 and 5.

Referring then to FIG. 4, there is shown a flow chart of a NAPS editor which is table-driven by a table such as that shown in TABLE 3. The flow chart of FIG. 4 does the table look-ups necessary to control the editor functions while FIG. 5 is a flow chart of the process for actually performing the edits. The flow chart of FIG. 4 starts in start box 90 where box 91 is entered to unpack the fields from the top NAPS element of the destination address. The return pointer is then initiated to null, the return value used when the edit attempt is unsuccessful. Box 93 is then entered to search the edit table (TABLE 3 above), using the NodeName and AgentName values from the NAPS as the initial search keys. The NodeName portion of the search key is first held constant while the AgentName portion is searched in box 93, increasingly generalized by successively substituting increasingly more general wildcard values until either a matching entry is found or until all wildcards have been used, as determined by decision box 94. This procedure assumes that the Agent- Name is a sequence of sub-strings separated by periods, i.e., a global name in one of the standard global formats described above. If a match is found, box 99 is entered to update the destination NAPS. If no match is made with the AgentName field, as determined by decision box 94, box 95 is entered where the NodeName field is searched in the edit table. The search in box 95 is also increasingly generalized by successively substituting increasingly more general wildcard values until either a matching entry is found or until all wildcards have been used, as determined by decision box 96. At each level of search in box 95, the AgentName value is reset to the original value. If an edit table entry is found by decision box 96, box 99 is entered to update the destination NAPS, as will be discussed in connection with FIG. 5. If the destination NAPS is updated in box 99, box 97 is entered to set the return pointer to the new NAPS produced in box 99. The process of FIG. 4 terminates in box 98. Note that, if no NAPS editing takes place due to the failure to find an edit table entry, the initialized null returned pointed is returned, signaling a routing error.

The destination NAPS updating procedure of box 99 in FIG. 4 is shown in detail in FIG. 5. Referring to FIG. 5, there is shown a flow chart of the destination NAPS updating procedure referred to in connection with box 99 of FIG. 4. Starting in start box 100, box 101 is entered to initialize the return destination element to a null value. Box 102 is then entered to test the NewNodeName and NewAgentName values obtained from the Edit Table (TABLE 3) in the process of FIG. 4 are compared to the NodeName and AgentName values in the top NAPS element of the message header. This test prevents infinite recycling of the editor due to errors in the edit table. If these values are the same, box 105 is entered to return the null values (initialized in box 101) to the calling program, indicating a edit failure.

If the edit table values of NewNodeName and NewAgentName are different from the values in the top NAPS element, as determined by decision box 103, box 104 is entered to execute the edit action specified in the edit table. As shown in FIG. 5, these edit actions include at least pop, push and replace the top element of the NAPS. Other editing actions are, of course, possible and will be obvious to those skilled in the art. These editing actions are under control of the edit table and can be specified by the network administrator, by the source user or by the destination user of the network.

If a pop editing action is specified in the edit table, box 108 is entered where the top element in the NAPS stack is popped off of the stack and the return pointer is set to the new top element. If there are no more NAPs components in the stack, the message is considered undeliverable and a null pointer is set in box 105, indicating an edit failure. If a new NAPS element is constructed from the values in the NewNodeName, NewAgentName and NewAgentParm fields of the NAPS edit table entry, box 105 is entered where that new NAPS element is pushed onto the NAPS stack in the header of the message. These new NAPS element field values can be null or a control character used to replicate the previous value in that field. The return pointer is set in box 105 to point to the newly pushed NAPS element. If one or more fields of the top NAPS element are to be replaced, box 109 is entered where the desired NAPS elements fields are replaced. As before, a null value or a replacement symbol can be used as the replacement value for any field value. Again, the return pointer is set in box 105 to reference the top NAPS element. The process of FIG. 5 terminates in return box 107.

Figure 6:
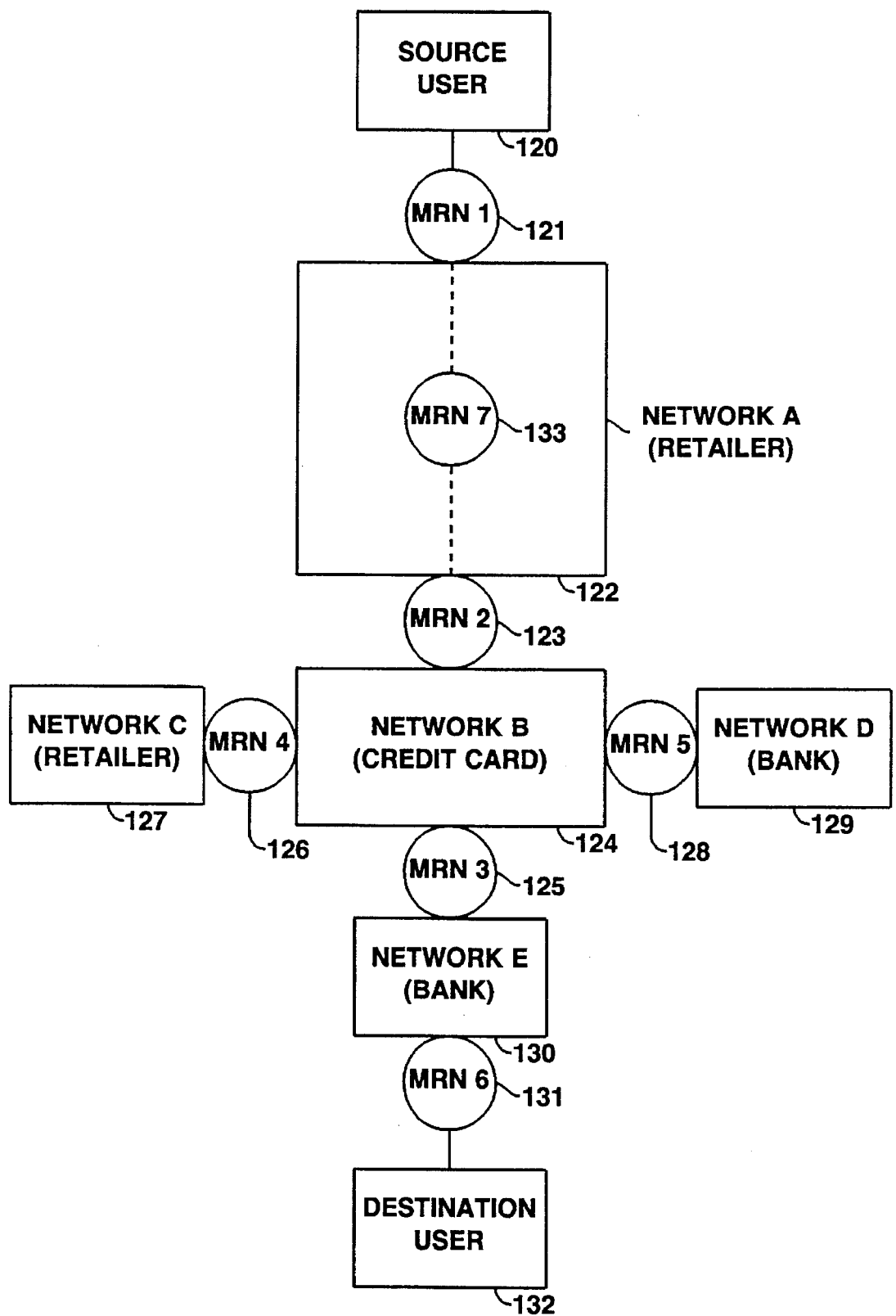
FIG. 6 shows a general block diagram of an illustrative packet communications system involving several separately administered packet networks and utilizing the destination address editing capabilities of the present invention.

The operation of the NAPS editing function in the RAPs of the present invention will be illustrated in detail in connection with the packet communications system of FIG. 6. The system of FIG. 6 is for a credit card authorization application between a plurality of retailer networks 122 and 127 and a plurality of bank networks 129 and 130, using a backbone credit card network 124. Message routing nodes 121, 123, 125, 126, 128, 131 and 133 serve not only as routing editing RAPs but, except for node 133, also as inter-network connection nodes shared by the two networks on which they appear. It is to be understood that each of networks 122, 124, 127, 129 and 130 includes a plurality of other internal nodes interconnecting a plurality of users with each other for the purposes of communicating intra-network information as is well known in the art. It will be assumed for the purposes of this example that a source user 120, for example a point-of-sale (POS) terminal in a retail establishment, issues a message requesting a charge authorization from the bank which has issued the customer's credit card. This request message is delivered to the bank destination user 132 which returns an authorization (or denial) of credit message back to the source user 120.

Beginning at source user 120, when a customer charges a purchase at a retail establishment, the clerk at the point-of-sale (POS) terminal pulls the credit card through the card reader and the point-of-sale terminal creates an authorization message to be sent across network 122. This message will, of course, eventually arrive at an IMS application in a mainframe computer owned by the bank owning the bank network 130. The point-of-sale terminal is called an MR client node, indicating that the POS terminal knows nothing about routing messages, but relies on the adjacent MR node 121 to provide this function. For specificity, it is assumed that the global node name of the POS terminal is (SNA, USSEERAW.POS234X1). The message constructed by the POS terminal is as follows, omitting details not related to this example:

---

MessageClass=CCAUTH
DestinationNAPS:
   Element-1
        NodeName=null
        AgentName=(IP,Authorize.Passport.com)
        AgentParm='CardNo=909_4564_7866_0013;
                ExpDate=19950923;Amt=$89.16'
OriginNAPS:
   Element-1
        NodeName=(SNA,USSEERAW.POS234X1)
        AgentName=(SNA,USSEERAW.CCTRANS)
        AgentParm=null

---

When this message is passed to entry node 121, node 121 first examines the NodeName field of the top element of the destination NAPS (box 73, FIG. 3). As can be seen above, this field is null and therefore node 121 looks in the Local Active Agent Table for an active agent or Routing Agent Program with the name (IP,Authorize.Passport.com). Since there will be no entry to match this agent name, the message will be submitted for NAPS editing (box 76, FIG. 3). The destination NAPS edit process pushes a new element onto the destination NAPS that contains the node name "(SNA, USSEERAW.AWSRV193)," the global name of routing server node 133 inside of network 122 and which is enroute to message routing node 123. When the editing is done, the message appears as follows:

---

MessageClass=CCAUTH
DestinationNAPS:
   Element-1
        NodeName=(SNA,USSEERAW.AWSRV193)
        AgentName=null
        AgentParm=null
   Element-2
        NodeName=null
        AgentName=(IP,Authorize.Passport.com)
        AgentParm='CardNo=909_4564_7866_0013;

-continued

```
                    ExpDate=19950923;Amt=$89.18'
OriginNAPS:
   Element-1
              NodeName=(SNA,USSEERAW.POS234X11)
              AgentName=(SNA,USSEERAW.CCTRANS)
              AgentParm=null
```

The internal message routing node 133 within network 122 will also try to route this message. When the destination node name field is examined (box 73, FIG. 3), the destination node will be this node ("ON_ME," box 73, FIG. 3)(node 133) and the agent name field will be examined. As noted above, the agent name field contains "null." Node 133 therefore attempts to edit the top NAPS element, as shown in flow chart of FIG. 3. The edit table in node 133 is consulted and the following entry is found:

TABLE 4

Edit Table

| Node Name | Agent Name | Action | New Node Name | NewAgent Name |
|---|---|---|---|---|
| (SNA,USSEERAW.-AWSRV193) | null | Pop | null | null |

This entry causes the top element of the NAPS to be popped and discarded (box 108, FIG. 5), exposing the next NAPS element. This next element is, of course, the original NAPS element attached to the message. Routing node 133 will now try to route the message according to the new NAPS element ("YES" in box 77, FIG. 3). Since the node name field of the new NAPS is still "null," the routing node 133 searches the agent table (box 75 in FIG. 3) for the agent or Routing Agent Program (RAP) with the designation (IP,Authorize.Passport.com). Since no such entry exists, the NAPS will be submitted to the editor for editing. An edit table entry is found as follows:

TABLE 5

Edit Table

| Node Name | Agent Name | Action | New Node Name | NewAgent Name |
|---|---|---|---|---|
| null | (IP, Authorize.-Passport.com) | Push | (IP, GWSEERS9.-Passport.com) | (IP, Gateway.-Passport.com) |

This entry causes a new NAPS element to be pushed onto the NAPS stack with the noted field values. The message header will then look as follows:

```
MessageClass=CCAUTH
DestinationNAPS:
   Element-1
              NodeName=(IP,GWSEERS9.Passport.com)
              AgentName=(IP,Gateway.Passport.com)
              AgentParm=null
   Element-2
              NodeName=null
              AgentName=(IP,Authorize.Passport.com)
              AgentParm='CardNo=989_4564_7865_0013;
                        ExpDate=19950923;Amt=$89.16
OriginNAPS:
   Element-1
              NodeName=(SNA,USSEERAW.POS234X1)
              AgentName=(SNA,USSEERAW.CCTRANS)
              AgentParm=null
```

When MRN 133 tries to reroute this message, it will see that the message is destined for a different node, and will therefore consult its Destination Node Routing Table (TABLE 2 above). The Destination Node Table, in turn, will identify the pipe to the next adjacent node and queue the message for that node. The next node may or may not be (IP,GWSEERS9.Passport.com). If not, the Routing Services (RS) at that node will also see that the message is destined for another node, will consult its Destination Node Table and queue the message to the pipe specified in that table, transporting the message to the next adjacent node via the pipe. These steps will be repeated until the message finally arrives at node 123, identified as (IP,GWSEERS9.Passport.com), which is the gateway between the retailer network 122 and the credit card backbone network 124.

At node 123, the RS detects that the message is destined for this node and attempts to route the message to an agent or RAP with the name (IP,Gateway.Passport.com). This time, it finds that a RAP with that name exists and is active, and queues the message to that RAP. When the message is delivered to the RAP identified as "(IP,Gateway.Passport.com)," the RAP, will first pop the top element off of the destination NAPS stack, so the message will once again look like it did when it was first created. This RAP will then examine the AgentParm field of the new top NAPS element to determine the credit card number. Using a translation algorithm proprietary to the credit card company, the credit card number is translated to the name of the bank owning the credit card account. In this case, the bank operating bank network 130 is the bank owning the credit card account. The editing facilities at this RAP will then push a new destination element onto the destination NAPS stack, and will push a new source element onto the source NAPS stack, resulting in a message looking as follows:

```
MessageClass-CCAUTH
DestinationNAPS:
   Element-1
              NodeName=(IP,GWPassport3.Banc-Two.com)
              AgentName=(IP,Gateway.Banc-Two.com)
              AgentParm=null
   Element-2
              NodeName=null
              AgentName=(IP,Authorize.Passport.com)
              AgentParm='CardNo=989_4564_7865_0013;
                        ExpDate=19950923;Amt=$89.16'
OriginNAPS:
   Element-1
              NodeName=(IP,GWSEERS9.Passport.com
              AgentName=null
              AgentParm=null
   Element-2
              NodeName=(SNA,USSEERAW.POS234C1)
              AgentName=(SNA,USSEERAW.CCTRANS)
              AgentParm=null
```

The new element on the destination NAPS stack will route the message to a RAP on a gateway node owned by BANC-TWO, e.g., node 125. The new element on the origin NAPS stack will assist the routing of the return message. When the routing nodes in network 124 attempt to reroute the message, they will now see that the message is destined for another node. By consulting their Destination Node Routing Tables, these nodes will determine which pipes to queue the message for transport to the next node on the route. Eventually, the message will be received at node 125, identified as (IP,GWPassport3.Banc-Two.com) in the destination NAPS.

When the message reaches node 125, the Routing Services will route the message to the RAP named "(IP,Gateway.Banc-Two.com)." This RAP will pop the top element off of the destination NAPS stack and examine the element underneath. It will then note that the original AgentName field has requested a credit authorization transaction. The AgentParm field, moreover, is then examined to confirm that the bank requested is the Banc-Two, again by translating the credit card number. It can be assumed that Banc-Two has decentralized its operation and includes a number of different credit card databases. It is therefore necessary for the RAP to determine to which computer database to route the message. The RAP will then modify the remaining element of the NAPS stack, and push yet another element onto the origin NAPS stack so that the message now looks as follows:

```
MessageClass=CCAUTH
DestinationNAPS:
   Element-1
            NodeName=(SNA,USBTWOAW.REGION12)
            AgentName=(UNDEF, CCAUTH)
            AgentParm='CCard=PASSPORT;
                    CardNo=999_4564_7866_0013;
                    ExpDate=19950923;Amt=$89.16'
OriginNAPS
   Element-1
            NodeName=(IP,GWPassport3.Banc_Two.com)
            AgentName=null
            AgentParm=null
   Element-2
            NodeName=(IP,GWSEERS9.Passport.com)
            AgentName=null
            AgentParm=null
   Element-3
            NodeName=(SNA,USSEERAW.POS234X1)
            AgentName=(SNA,USSEERAW.CCTRANS)
            AgentParm=null
```

When a routing node within network 130 attempts to route this message, it will see that the message is destined for a different node. Consulting its Destination Node Routing Table, it will forward the message according to the pipes found in this table. The message will thereby be forwarded across network 130 until it reaches node 131, identified as (SNA,USBTWOAW.REGION12). At node 131, the message will be routed to the destination user 132, identified in the message as (UNDEF,CCAUTH). The user agent 132 is responsible for authorizing all credit card transactions from all of the credit card retailers with which BANC-TWO is associated. User agent 132 will perform the requested authorization and build a return message to be sent back to the originating point-of-sale (POS) terminal. In this process, the destination NAPS stack of the incoming message is moved to the origin NAPS stack of the return message, the origin NAPS stack of the incoming message is moved to the destination NAPS stack of the return message, and the response is placed in the AgentParm field of the deepest element in the resulting destination NAPS stack. The return message will look like this:

```
MessageClass=CCAUTH
DestinationNAPS:
   Element-1
            NodeName=(IP,GWPassPort3.Banc-Two.com)
            AgentName=null
            AgentParm=null
   Element-2
            NodeName=(IP,GWSEERS9.Passport.com)
            AgentName=null
            AgentParm=null
   Element-3
            NodeName=(SNA,USSEERAW.POS234X1)
            AgentName=(SNA,USSEERAW.CCTRANS)
            AgentParm='Reject!;Cut_Up_Card;Call_Police'
OriginNAPS:
   Element-1
            NodeName=(SNA,USBTWOAW.REGION12)
            AgentName=(UNDEF,CCAUTH)
            AgentParm=null
```

This message is launched to node 131 where the Routing Program will examine the NodeName field and, seeing that the message is for another node with consults its Destination Node Routing Table and queue the message for the appropriate pipe. The message will make its way across the bank's network 130 until it reaches node 125, identified as (IP, GWPassport3.Ban-Two.com). At this node the message is submitted for NAPS editing (since the AgentName is null) and an appropriate entry in the Edit Table will cause the top entry to be popped off of the Destination NAPS stack. The message is then routed across the credit card network 124 to node 123, identified as (IP,GWSEERS9.Passport.com). At node 123, the message is again submitted for NAPS editing and, in response to an appropriate entry in the NAPS edit table, this entry will be popped off of the destination NAPS stack to expose the bottom NAPS entry. Using this destination, the message is then routed across the retailer network 122, through node 133, to the node 121, identified as (SNA,USSEERAW.POS234X1). The message is then routed to the point-of-sale user 120, identified as (SNA, USSEERAW.CCTRANS), where the message in the Agent-Parm field will be displayed to the retail clerk.

It can be seen that the example described in connection with FIG. 6 utilizes NAPS stacks to represent both the origin address and the destination address for user messages to be routed across a plurality of different packet communications networks. Routing programs at intermediate nodes in the different networks edit the NAPS elements to ensure the forwarding of the message to the appropriate destination even when the originating station does not know the address of the ultimate destination. A non-address field (AgentParm) is included in the NAPS element to assist in both routing and processing of the message.

What is claimed is:

1. A user-invokable message routing system for packet communications networks for routing messages across said networks from an originating station on one of said networks to a destination station on one of said networks, said routing system comprising means for defining origin and destination addresses with a user-specified stack of nested multi-element address specifications, means, at at least one intermediate node in said networks, for editing said user-specified stack of said nested multi-element address specifications, each of said nested multi-element address specifications comprising means for identifying a node on one of said networks;

means for identifying a user agent on one of said networks; and means for specifying arbitrary parameters to said user agent on one of said networks.

2. A user-invoked method for routing messages through packet communications networks from an originating station on one of said networks to a destination station on one of said networks, said method comprising the steps of defining origin and destination addresses with a user-specified stack of nested multi-element address specifications, and editing, at at least one intermediate node in said networks, said user-specified stack of said nested multi-element address specifications, each of said multi-element address specifications performing the steps of identifying a node on one of said networks;

identifying a user agent on one of said networks; and specifying arbitrary parameters to said agent on one of said networks.

\* \* \* \* \*